Patented Jan. 24, 1933                                                     1,894,975

UNITED STATES PATENT OFFICE

JOSEPH N. BORGLIN, OF KENVIL, NEW JERSEY, ASSIGNOR TO HERCULES POWDER COMPANY, OF WILMINGTON, DELAWARE, A CORPORATION OF DELAWARE

METHOD OF REFINING ROSIN

No Drawing.            Application filed November 11, 1930. Serial No. 494,926.

My invention relates to method for the refining of rosin. My invention relates to the refining of both wood and gum rosin and more particularly relates to the treatment of rosin for the removal of color bodies therefrom.

As is well known, gum rosin is derived from live pine trees by bleeding, while wood rosin is derived by extraction from pine wood, as stump wood, down wood, and the like.

Both wood and gum rosin contain color bodies or coloring matter which is visible to the eye and the rosin is more or less dark in color, depending upon the grade of the rosin observed. Wood rosin and certain low grades of gum rosin in addition to containing visible color bodies or coloring matter contain certain color bodies which are not normally visible to the eye, but which have a tendency to darken and discolor the rosin or its product, as when such color bodies are exposed to the action of air and an alkali, as for example, when the rosin is saponified.

The presence of visible coloring matter in rosin determines its grade and hence its value. The darker the rosin the lower its grade and value. The presence of invisible or, as I refer to them, latent color bodies while not effecting the apparent grade of the rosin, is highly disadvantageous and renders the rosin undesirable for use in the production of, for example, soaps, sizes, limed varnishes, etc., etc. where palest color of the product and retention of color are desired.

Now, in accordance with my invention I provide a method whereby visible color bodies and latent color bodies, where present, may be removed from rosin in a simple and highly efficient manner and whereby rosin may be improved in grade and latent color bodies may be largely removed from wood rosin rendering such adaptable to uses for which it does not lend itself normally.

The method in accordance with my invention, from the broad standpoint, involves the treatment of rosin with a metallic halide in solution. The treatment involves removal from the rosin of color bodies, visible and latent, it having been discovered by me that metallic halides in solution have the capacity for removing such color bodies from rosin.

More particularly the method in accordance with my invention involves the treatment of rosin for the removal of color bodies with a metallic halide in solution in a suitable solvent therefor and still more particularly involves the treatment of the rosin in solution in a suitable solvent, it being noted that where the rosin and metallic halide are respectively in solution, they may be intimately contacted with one another.

If desired and for obtaining a maximum intimacy of contact between the rosin in solution and the metallic halide in solution the solutions in admixture may be heated and when heated will be subsequently cooled in order to promote their separation. If desired, the admixed solutions may be cooled for their separation, even though they be not heated in admixture. Where the rosin in solution is treated with a metallic halide in solution, the rosin solution may desirably have a concentration of about 15% rosin and the solvents for the rosin and the metallic halide respectively will be immiscible or capable of being rendered immiscible as, for example, by cooling.

In the practical adaptation of the method embodying my invention, I may use as the metallic halide, for example, stannic chloride, zinc chloride, antimony trichloride, antimony pentachloride, sodium iodide, ammonium bromide, sodium bromide, etc.

As the solvent for the metallic halide, I may use, for example, an alcohol, as methyl, ethyl, butyl, etc. alcohol, or I may use acetone, ethyl acetate, pentasol, etc., etc. As the solvent for the rosin, I may use, for example, a light petroleum distillate, as gasoline, petroleum ether, naphtha, or the like, or I may use pinene, dipentene, etc.

It will be understood that where the rosin is treated in solution in a solvent with a metallic halide in solution in a solvent, the solvents used will be respectively immiscible or capable of being rendered immiscible by control of conditions, as for example, by cooling. Further, as will be obvious to those skilled in the art, in the selection of a solvent for the metallic halide, a solvent will be selected which will not react with the metallic halide. Thus, metallic halides, as arsenic chloride, fuming stannic chloride and titanium tetrachloride are known to react with alcohol and hence cannot be employed in alcohol solution. Such metallic halides may, for example, be added directly to gasoline-rosin solution with agitation, followed by the addition of alcohol to dissolve precipitate which is formed by the treatment with the halide.

As illustrative of the practical adaptation of my invention to the refining of rosin, for example, 300 parts, by weight, of a 15% solution of, for example, wood rosin grading FF in, for example, gasoline, are shaken with 50 parts of a 50% solution of stannic chloride ($Sn\ Cl_4.5\ H_2O$) in 92% alcohol, say, for example, ethyl alcohol, and then with water. After the gasoline-rosin solution has been thoroughly washed the chloride-alcohol solution is separated from the rosin solution and the rosin is then recovered from the gasoline-rosin solution, as by evaporation off of the gasoline. About 30 parts of high grade rosin will be recovered. While the two solutions may be shaken at any desired temperature, they will be shaken desirably at a temperature of say about 25° C. After the solutions are shaken together for a sufficient time to enable the stannic chloride solution to thoroughly wash the rosin solution, the two solutions are permitted to separate, desirably at a temperature of about 25° C. When the solutions have separated the refined rosin solution is drawn off and washed with say about 100 parts of 70% alcohol. On completion of the washing the alcohol and refined rosin solution are permitted to settle into layers and the alcohol layer separated from the refined rosin solution layer, after which the refined rosin is recovered by evaporating off the solvent.

As a further illustration, for example, to 300 parts of solution of rosin, grade FF in, for example, gasoline, 5 parts of, for example, fuming stannic chloride or arsenic chloride is added with agitation. To the mixture is then added about 100 parts of, for example, 70% alcohol, with agitation. Color bodies, including latent color bodies of the original rosin, will be removed therefrom by the chloride and separated therefrom with the chloride-alcohol solution. The added alcohol will dissolve the precipitate which is formed by the treatment of the rosin solution with the chloride. The chloride and added alcohol are separated from the gasoline-rosin solution and rosin recovered from the gasoline-rosin solution by, for example, evaporation off of the gasoline. In the example given a yield of about 65% of rosin, grading H, will be obtained. The color bodies, including latent color bodies, if the rosin treated be wood rosin or contain such, will be removed from the rosin by the chloride and will be separated therefrom in the separation therefrom of the chloride and alcohol.

As further illustrating the practical adaptation of my invention, for example, say 300 grams of a solution of rosin grading FF in, for example, gasoline, are washed with 50 grams portions of, for example, a saturated solution of sodium iodide in about 92% alcohol, as for example, ethyl alcohol. The gasoline-rosin solution may be desirably given say 3 washes, the iodide-alcohol solution being separated after each wash. After separation of the iodide-alcohol solution from the gasoline-rosin solution after the final wash, the gasoline-rosin solution may be washed with say 70% ethyl alcohol and then with water, which is separated, and the rosin is finally recovered from the gasoline-rosin solution by evaporation off of the gasoline. In the example given about a 71% yield of rosin, grading H will be obtained.

It will now be noted that the method in accordance with my invention involves the treatment of rosin, either wood or gum rosin, for the removal of color bodies, including latent color bodies normally present in wood rosin and when present in gum rosin, with a metallic halide, it having been discovered by me that metallic halides in solution have the capacity for removing such color bodies from rosin.

It will be understood that while in accordance with my invention, from the broad standpoint, I contemplate broadly the use of metallic halides in solution, in the practical adaptation of my invention, for convenience, the rosin may be treated in solution in any suitable solvent with a metallic halide in solution in any suitable solvent. The rosin solvent and the solvent for the metallic halide will be selected with consideration for the necessity for effecting separation between the two solutions and with consideration to the question of reaction between the metallic halide chosen and its solvent, all of which will be obvious to those skilled in the art.

It will be understood that no particular form of apparatus is required for the carrying out of my invention and that I contemplate its carrying out in any suitable form of apparatus. Further, it will be understood that I contemplate various technique and modifications in the details herein disclosed in connection with the practical adaptation of my invention without departing from the fundamental concept involved.

What I claim and desire to protect by Letters Patent is:

1. The method for removing color bodies from rosin which includes treating rosin in solution in a solvent therefor with a suitable metallic halide in solution in a solvent therefor capable of substantial immiscibility with the solvent for the rosin, separating the solutions and recovering refined rosin from the rosin-solvent solution.

2. The method for removing color bodies from rosin which includes treating rosin in solution in a hydrocarbon solvent therefor with a suitable metallic halide in solution in an alcohol, separating the solutions and recovering refined rosin from the rosin-solvent solution.

3. The method for removing color bodies from rosin which includes treating rosin in solution in a hydrocarbon solvent therefor with a suitable metallic halide in solution in ethyl alcohol, separating the solution and recovering refined rosin from the rosin-solvent solution.

4. The method for removing color bodies from rosin which includes treating rosin in solution in gasoline with a suitable metallic halide in solution in a monohydric alcohol, separating the solutions and recovering refined rosin from the rosin-gasoline solution.

5. The method for removing color bodies from rosin which includes treating rosin in solution in gasoline with a suitable metallic halide in solution in ethyl alcohol, separating the solutions and recovering refined rosin from the rosin-gasoline solution.

6. The method for removing color bodies from rosin which includes treating rosin in solution in a solvent therefor with a suitable metallic chloride solution which is capable of immiscibility with the rosin solution, separating the solutions and recovering refined rosin from the rosin-solvent solution.

7. The method for removing color bodies from rosin which includes treating rosin in solution in a solvent therefor with a suitable metallic chloride solution which is capable of immiscibility with the rosin solution, separating the solutions and recovering refined rosin from the rosin-solvent solution in solution in a solvent therefor capable of substantial immiscibility with the solvent for the rosin.

8. The method for removing color bodies from rosin which includes treating rosin in solution in a solvent therefor with a suitable metallic iodide solution which is capable of immiscibility with the rosin solution, separating the solutions and recovering refined rosin from the rosin-solvent solution.

9. The method of removing color bodies from rosin which includes admixing a rosin solution and a solution of a suitable metallic halide in a solvent therefor which is capable of immiscibility with the solvent for the rosin, cooling the admixed solutions, separating the solutions and recovering refined rosin from the separated rosin solution.

10. The method of removing color bodies from rosin which includes admixing a rosin solution and a solution of a suitable metallic halide in a solvent therefor which is capable of immiscibility with the solvent for the rosin, heating the admixed solutions, cooling the admixed solutions, separating the solutions and recovering refined rosin from the separated rosin solution.

11. The method of removing color bodies from rosin which includes admixing a solution of rosin in gasoline and a solution of a suitable metallic halide in a monohydric alcohol, cooling the admixed solutions, separating the solutions and recovering refined rosin from the separated rosin solution.

12. The method of removing color bodies from rosin which includes admixing a solution of rosin in gasoline and a solution of a suitable metallic halide in a monohydric alcohol, heating the admixed solutions, cooling the admixed solutions, separating the solutions and recovering refined rosin from the separated rosin solution.

13. The method of removing color bodies from rosin which includes admixing a suitable metallic halide with a solution of rosin in a solvent therefor, adding a monohydric alcohol, separating the halide and alcohol from the rosin-solvent solution and recovering refined rosin from the separated rosin-solvent solution.

14. The method for removing color bodies from rosin which includes treating rosin in solution in a solvent therefor with a metallic bromide solution which is capable of immiscibility with the rosin solution, separating the solutions and recovering refined rosin from the rosin-solvent solution in solution in a solvent therefor capable of substantial immiscibility with the solvent for the rosin.

15. The method for removing color bodies from rosin which includes treating rosin in solution in a solvent therefor with a metallic bromide solution which is capable of immiscibility with the rosin solution, separating the solutions and recovering refined rosin from the rosin-solvent solution.

16. The method of removing color bodies from rosin which includes admixing a rosin solution and a solution of a metallic bromide in a solvent therefor which is capable of immiscibility with the solvent for the rosin, cooling the admixed solutions, separating the solutions and recovering refined rosin from the separated rosin solution.

17. The method of removing color bodies from rosin which includes admixing a rosin solution and a solution of a metallic bromide in a solvent therefor which is capable of immiscibility with the solvent for the rosin, heating the admixed solutions, cooling the admixed solutions, separating the solutions and recovering refined rosin from the separated rosin solution.

18. The method of removing color bodies from rosin which includes admixing a solution of rosin in gasoline and a solution of a metallic bromide in a monohydric alcohol, cooling the admixed solutions, separating the solutions and recovering refined rosin from the separated rosin solution.

19. The method of removing color bodies from rosin which includes admixing a solution of rosin in gasoline and a solution of a metallic bromide in a monohydric alcohol, heating the admixed solutions, cooling the admixed solutions, separating the solutions and recovering refined rosin from the separated rosin solution.

20. The method of removing color bodies from rosin which includes admixing a metallic bromide with a solution of rosin in a solvent therefor, adding a monohydric alcohol, separating the bromide and alcohol from the rosin-solvent solution and recovering refined rosin from the separated rosin-solvent solution.

21. The method for removing color bodies from rosin which includes treating rosin in solution in gasoline with a suitable metallic halide in solution in methanol, separating the solutions and recovering refined rosin from the rosin-gasoline solution.

22. The method for removing color bodies from rosin which includes treating rosin in solution in gasoline with a metallic bromide in solution in methanol, separating the solutions and recovering refined rosin from the rosin-gasoline solution.

23. The method for removing color bodies from rosin which includes treating rosin in solution in gasoline with a metallic iodide in solution in methanol, separating the solutions and recovering refined rosin from the rosin-gasoline solution.

24. The method of removing color bodies from rosin which includes treating rosin in solution in a solvent therefor with a metallic halide, from the group stannic chloride, zinc chloride, antimony trichloride, antimony pentachloride, sodium iodide, ammonium bromide and sodium bromide, in solution in a solvent capable of immiscibility with the solvent for the rosin, separating the solutions and recovering refined rosin from the rosin-solvent solution.

In testimony of which invention, I have hereunto set my hand, at Kenvil, N. J., on this 3rd day of November, 1930.

JOSEPH N. BORGLIN.